US005933332A

United States Patent [19]

Honma

[11] Patent Number: 5,933,332

[45] Date of Patent: Aug. 3, 1999

[54] CONVERTER TRANSFORMER

[75] Inventor: Tooru Honma, Funabashi, Japan

[73] Assignee: TDK Corporation, Tokyo, Japan

[21] Appl. No.: 09/236,370

[22] Filed: Jan. 25, 1999

Related U.S. Application Data

[62] Division of application No. 08/843,237, Apr. 14, 1997.

[30] Foreign Application Priority Data

Apr. 27, 1996 [JP] Japan .................................... 8-130831

[51] Int. Cl.$^6$ .................................................... H02M 3/335

[52] U.S. Cl. ................................................ 363/20; 363/97

[58] Field of Search ................................. 363/17, 20, 21, 363/95, 97, 98, 55, 56, 132; 323/285, 351, 902; 336/185, 183, 198, 208, 136

[56] References Cited

U.S. PATENT DOCUMENTS

| | | | |
|---|---|---|---|
| 3,089,081 | 5/1963 | Brosh . | |
| 4,073,003 | 2/1978 | Chambers | 363/20 |
| 4,500,833 | 2/1985 | Napp et al. . | |
| 4,680,566 | 7/1987 | Goseberg et al. . | |
| 4,937,727 | 6/1990 | Leonardi | 363/97 |
| 4,945,332 | 7/1990 | Sakamoto et al. . | |
| 4,968,106 | 11/1990 | Ikeuchi et al. | 315/411 |
| 5,032,967 | 7/1991 | Marinus et al. | 363/21 |
| 5,060,128 | 10/1991 | Onodera et al. | 363/20 |
| 5,331,532 | 7/1994 | Iwai et al. | 363/20 |
| 5,555,494 | 9/1996 | Morris | 363/17 |
| 5,576,941 | 11/1996 | Nguyen et al. | 363/21 |
| 5,600,293 | 2/1997 | Hunter | 336/182 |
| 5,659,461 | 8/1997 | Inou et al. | 363/21 |

FOREIGN PATENT DOCUMENTS

| | | |
|---|---|---|
| 0 071 008 | 2/1983 | European Pat. Off. . |
| 4-133411 | 12/1992 | Japan . |

*Primary Examiner*—Adolf Deneke Berhane
*Attorney, Agent, or Firm*—Oblon, Spivak, McClelland, Maier & Neustadt, P.C.

[57] ABSTRACT

A transformer has a bobbin made of a resin material having flanges (2$a$ to 2$f$) formed thereon, at least three chambers defined between the adjacent flanges. A primary auxiliary winding (P2), which supplies an electric power to an drive-control and overvoltage protection circuit, and a primary excitation winding (P1-1) are wound on the chambers (3$a$ and 3$c$) with at least one chamber (3$b$) disposed therebetween. A secondary winding (S2) which consumes the electric power always is wound on the chamber (3$b$) between the chambers (3$c$ and 3$a$) on which the primary excitation winding (P1-1) and the primary auxiliary winding (P2) are wound.

2 Claims, 9 Drawing Sheets

CONVERTER TRANSFORMER

This application is a Division of application Ser. No. 08/843,237 Filed on Apr. 14, 1997, now pending.

BACKGROUND OF THE INVENTION

1. Field of the Invention

The present invention relates to a converter transformer used in a switching regulator or the like employing the circuit of a fly-back converter.

2. Description of the Prior Art

As shown in FIG. 6, the circuit of a fly-back converter of a general type has a converter transformer T. An input rectifying circuit BR1 for rectifying an input voltage Vin, a fuse F1, a drive-control and overvoltage protection circuit CNT1, a photo coupler consisting of a light emitting element PC1-2 and a light receiving element PC1-1, a main switching element Q1, an output detecting circuit REF1, resistors R1 to R7, capacitors C1 to C6, diodes D1 to D4, an inductor L1, and the like.

This transformer T has primary windings consisting of a primary excitation winding P1 and a primary auxiliary winding P2 and secondary windings consisting of a secondary winding S1 for producing a main operating voltage and another secondary winding S2 for producing another operating voltage.

In operation, the AC input Vin is rectified by the input rectifying circuit BR1 and is smoothed by the capacitor C1 to be converted to a DC voltage. This DC voltage is the input voltage of the converter transformer.

The capacitor C4 is charged by a starting current flowing through the starting resistor R1 to actuate the drive-control and overvoltage protection circuit CNTI. Then, the main switch Q1 is turned on, and an input voltage is impressed on the primary excitation winding P1 of the converter transformer T. In this state, the diodes D2, D3 and D4 are turned off, and all energy supplied to the primary excitation winding P1 is accumulated in the converter transformer T.

Then, the main switching element Q1 is turned off, and the diodes D2, D3 and D4 are turned on. The energy accumulated in the converter transformer T is supplied from the primary auxiliary winding P2 to the power source voltage side of the drive-control and overvoltage protection circuit CNT1 and is discharged from the secondary winding S1 which produces the main operating voltage and another secondary winding S2 which produces another operating voltage to the secondary output side.

The on/off drive control of the main switching element Q is made in the following way. The output detecting circuit REF1 connected to the output side of the secondary winding S1 which produces the main operating voltage detects the output voltage of the secondary winding S1 which produces the main operating voltage. The detected signal is fed back to the drive-control and overvoltage protection circuit CNT1 through the photo coupler consisting of the light emitting element PC1-2 and the light receiving element PC1-1. The fedback signal from the drive-control and overvoltage protection circuit CNT1 controls the drive of the main switching element Q1 connected to the primary excitation winding P1 so that the output voltage of the secondary winding S1 which produces the main operating voltage is stabilized.

The conventional converter transformer which operates by means of a fly-back converter circuit or the like has a structure as shown in FIGS. 7A and 7B or FIGS. 8A and 8B. In FIGS. 7A and 7B are shown a cross-sectional view and a circuit diagram of one of the conventional converter transformers, respectively. The transformer includes a bobbin 2 having a magnetic core 1 inserted therein and a plurality of flanges 2*a* to 2*d* formed thereon. Chambers 3*a* to 3*c* are individually defined between the adjacent flanges 2*a* to 2*d* on the bobbin 2. The primary excitation windings consist of a primary excitation winding P1-1 wound on a chamber 3*a* and another primary excitation winding P1-2 wound on another chamber 3*c*. The primary auxiliary winding P2 which is one of the primary windings is wound on the outer periphery of the primary excitation winding P1-1. The second windings S1 and S2 are wound in an overlapping manner on the chamber 3*b* between the chambers 3*a* and 3*c* on which the primary excitation windings P1-1 and P1-2 are wound individually. This arrangement ensures the electrical insulation satisfying the safety standard.

When the leakage inductance of the primary windings P1 (P1-1 and P1-2) and P2 and the secondary windings S1 and S2 is large, large spike voltage is produced in the windings P1, P2, S1 and S2 upon turning the main switching element Q1 off. In order to make the leakage inductance as small as possible, the primary excitation windings P1-1 and P1-2 are individually wound on the different chambers 3*a* and 3*c*, and the secondary windings S1 and S2 are wound on the chamber 3*b* between the chambers 3*a* and 3*c*, as described above.

In FIGS. 8A and 8B are shown a cross sectional view and a circuit diagram of another conventional converter transformer. In this transformer, the primary windings P1 and secondary windings S1 and S2 are divided into the primary windings P1-1, P1-2 and P1-3 and the secondary windings S1-1, S1-2, S2-1, and S2-2 which are more than those of the transformer as shown in FIGS. 7A and 7B. The primary windings P1-1, P1-2 and P1-3 are connected in series and wound on every other chambers 3*a*, 3*c* and 3*e*, respectively. A pair of the secondary windings S1-1 and S1-2 are connected in series, whereas another pair of the secondary windings S2-1 and S2-2 are connected in parallel. The secondary windings S1-1 and S1-2 are wound on the chamber 3*b* between the chambers 3*a* and 3*c* and on the chamber 3*d* between the chambers 3*c* and 3*e*, respectively. Further, the secondary windings S2-1 and S2-2 are wound around the secondary winding S1-1 on the chamber 3*b* and around the secondary winding S1-2 on the chamber 3*d*, respectively. The primary auxiliary winding P2 is wound on the outer periphery of one of the so-divided primary windings P1-2.

In these conventional converter transformers, the primary auxiliary winding P2 is an important winding which provides an electric power to the drive-control and overvoltage protection circuit CNT1 to control the main switching element Q1 as shown in FIG. 6. When, therefore, the spike voltage Vs produced in the primary auxiliary winding P2 upon turning the main switching element Q1 off is large as shown in FIG. 9, the fly-back converter circuit cannot be controlled stably with the result that the main switching element Q1 cannot operate suitably or the overvoltage protection circuit portion assembled in the fly-back converter circuit operates erroneously.

In order to suppress the spike voltage produced in the primary auxiliary winding P2 in the conventional converter transformer, it is necessary that the inductor L1, the resistor R4 and the like be connected in series to the primary auxiliary winding P2, or a snubber circuit consisting of the resistor R3 and the capacitor C3 be connected in parallel to the primary auxiliary winding P2.

SUMMARY OF THE INVENTION

An object of the present invention is to provide a fly-back converter transformer used in a fly-back converter, in which the spike voltage produced in the primary auxiliary winding can be reduced to simplify the snubber circuit.

Another object of the present invention is provide a converter transformer which has no circuit components for suppressing the spike voltage of the primary auxiliary winding or uses only a small number of such circuit components for suppressing the spike voltage, resulting in the reduction of the number of components of the transformer and miniaturization of the components, thereby lowering the cost of the transformer.

A further object of the present invention is to provide a converter transformer in which extremely high electrical insulation is achieved between the primary auxiliary winding and the primary excitation windings whereby the reliability of the transformer is improved.

A still further object of the present invention is to provide a converter transformer in which the spike voltage is extremely reduced when the load current is zero or very small.

In order to achieve these objects, the converter transformer in an aspect of the present invention comprises a bobbin made of resin and having an outer periphery and at least four flanges formed in tandem on the outer periphery, at least three chambers defined between the adjacent flanges, a primary auxiliary winding for supplying electric power to a drive-control and overvoltage protection circuit, the primary auxiliary winding being wound on one of the chambers, a primary excitation winding wound on another of the chambers, which is separated by one or two chambers from the primary auxiliary windings, at least one secondary winding which always consumes electric power and which is wound on one of the chambers between the primary auxiliary winding and the primary excitation winding.

In the present invention, the primary auxiliary winding is not wound on the primary excitation winding but is wound on a chamber which is separated by one or two cambers (hereinafter referred to as the “intermediate chamber”) from the chamber on which the primary excitation winding is wound. This arrangement weakens the magnetic connection between the primary excitation winding and the primary auxiliary winding. Since the secondary winding or primary winding which always exhausts electric power is wound on the intermediate chamber, the magnetic connection between the primary auxiliary winding and the winding wound on the intermediate chamber is enhanced, and existence of the winding on the intermediate chamber further weakens the magnetic connection between the primary excitation winding and the primary auxiliary winding. Thus, the spike voltage produced in the primary auxiliary winding can be reduced.

The reduction of the spike voltage allows for easy control of the flyback converter circuit and prevents the overvoltage protection circuit from operating erroneously. Thus, the circuit components for suppressing the spike voltage can be eliminated or the number of such components can be reduced. As a result, the number of the components is reduced and/or the components can be miniaturized. This leads to the lowering of the cost of the transformer.

As the primary auxiliary winding and the primary excitation winding are wound on the different chambers, the electrical insulation between the primary auxiliary winding and the primary excitation winding is remarkably improved, and thus the reliability of the transformer can be enhanced.

On the intermediate chamber which is disposed between the chambers on which the primary excitation winding and the primary auxiliary winding are wound is wound at least one of the primary windings which consumes an electric power and which is different from the above-mentioned primary winding, in place of the secondary winding. This arrangement remarkably reduces the spike voltage.

In another aspect of the present invention, there is provided a converter transformer comprising a bobbin made of resin and having an outer periphery and at five flanges formed in tandem on the outer periphery; at least four chambers defined between the adjacent flanges, a primary auxiliary winding for supplying electric power to a drive-control and overvoltage protection circuit, the primary auxiliary winding being wound on one of the chambers; a primary excitation winding wound on another of the chambers, which is separated by one or two chambers from the primary auxiliary winding; at least one secondary winding divided into at least two divided windings, one of the divided windings being wound on the chamber between the primary auxiliary winding and the primary excitation winding, and the other of the divided windings being wound on one of the chambers other than the chambers on which the primary auxiliary winding, the primary excitation winding and said one of the divided windings are wound; and said one of the divided windings being connected in parallel to at least one of the other of the divided windings. In this arrangement, a current flows through the secondary windings connected in parallel so that the spike voltage can be remarkably reduced when the load current is zero or very small.

DETAILED DESCRIPTION OF THE PREFERRED EMBODIMENTS

Figure 1A:
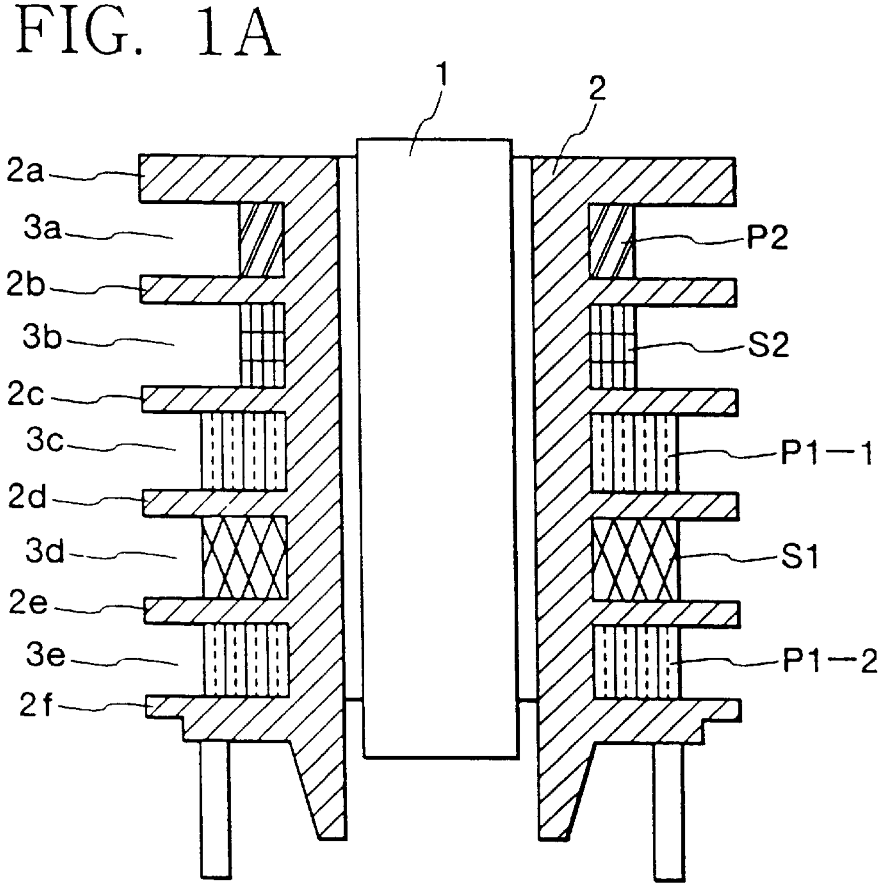
FIG. 1A is a cross-sectional view of an embodiment of the converter transformer according to the present invention, FIG. 1 B is a circuit diagram of the embodiment of FIG. 1 A
Figure 1B:
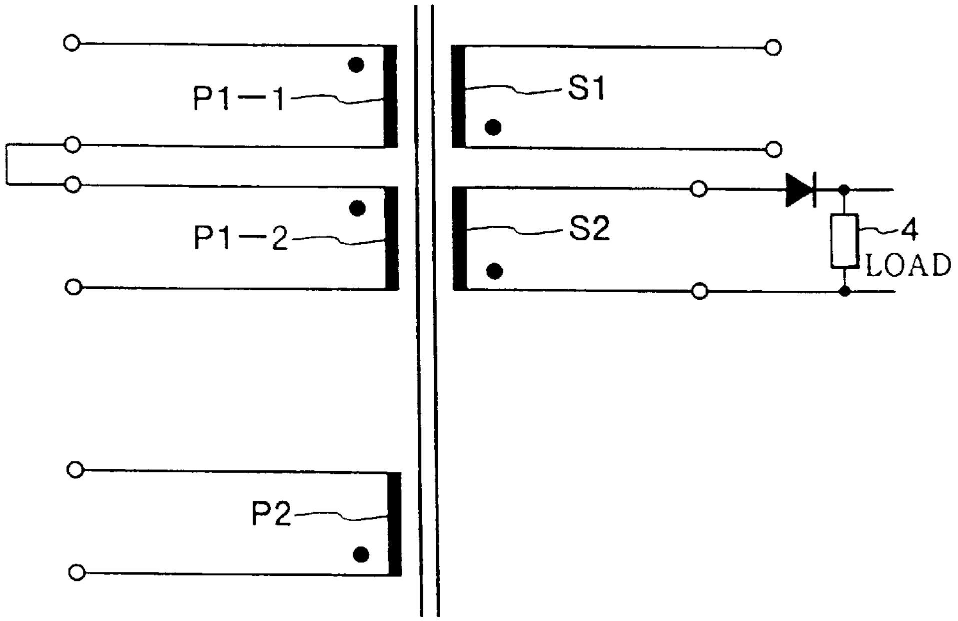

A first embodiment of the converter transformer according to the present invention will now be described with reference to FIG. 1A which is a cross-sectional view and FIG. 1B which is a circuit diagram. The transformer has a magnetic core 1 and a bobbin 2 into which the magnetic core 1 is inserted. Flanges 2*a* to 2*f* are formed in tandem on the outer periphery of the bobbin 2. Chambers 3*a* to 3*e* are separately defined between the adjacent flanges 2*a* to 2*f* so as to be provided separately from each other. On the chamber 3*a* at one of the extreme ends of the bobbin 2 is wound only a primary auxiliary winding P2. Primary excitation windings comprise two divided primary excitation windings P1-1 and P1-2 wound on the chambers 3*c* and 3*e*. Here, the chambers 3*a*, 3*c* and 3*e* are arranged with chambers 3*b* and 3*d* disposed therebetween. The divided primary excitation windings P1-1 and P1-2 are connected in series. However, they may be connected in parallel, instead.

A secondary winding S1 which produces the main operating voltage is not divided but is wound on one of the chambers 3*d*. A secondary winding S2 which produces another operating voltage is not divided and wound on the chamber 3*b* disposed between the chambers 3*a* and 3*c* on which the primary auxiliary winding P2 and the primary excitation winding P1-1 are wound. To the secondary winding S2 is connected a dummy or a load 4 which always exhausts the electric power so that the secondary winding S2 always exhausts the electric power.

In this way, the primary auxiliary winding P2 is not wound on the primary excitation winding P1-1 or P1-2 but is wound on the chamber 3*a* which is disposed separately from the chambers 3*c* and 3*e* on which the primary excitation windings P1-1 and P1-2 are wound. Owing to this arrangement, the magnetic connection between the primary excitation windings P1-1 and P1-2 and the primary auxiliary winding P2 is weakened.

Figure 6:
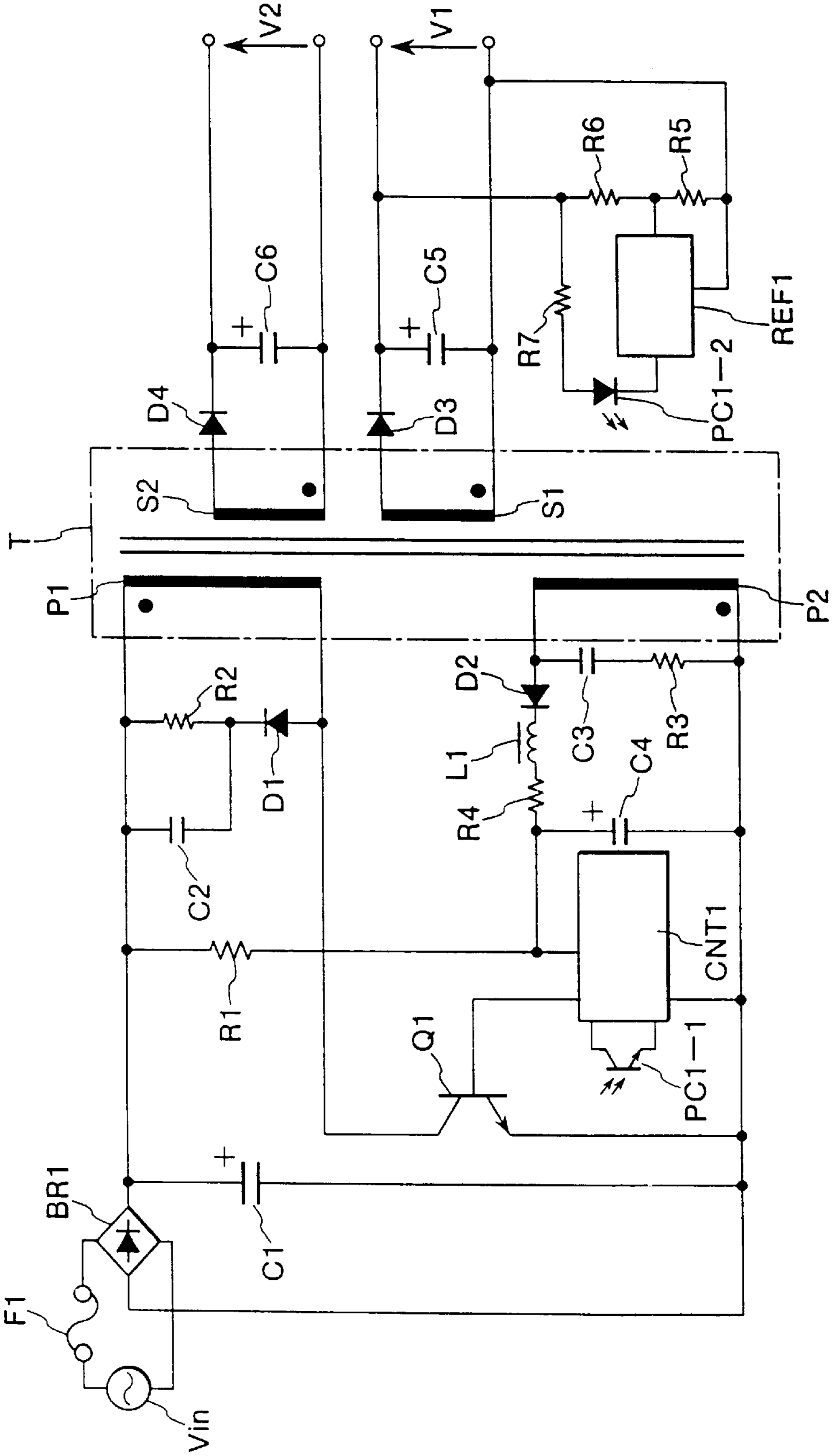
FIG. 6 is a circuit diagram of a flyback converter of a general type.
Figure 9:
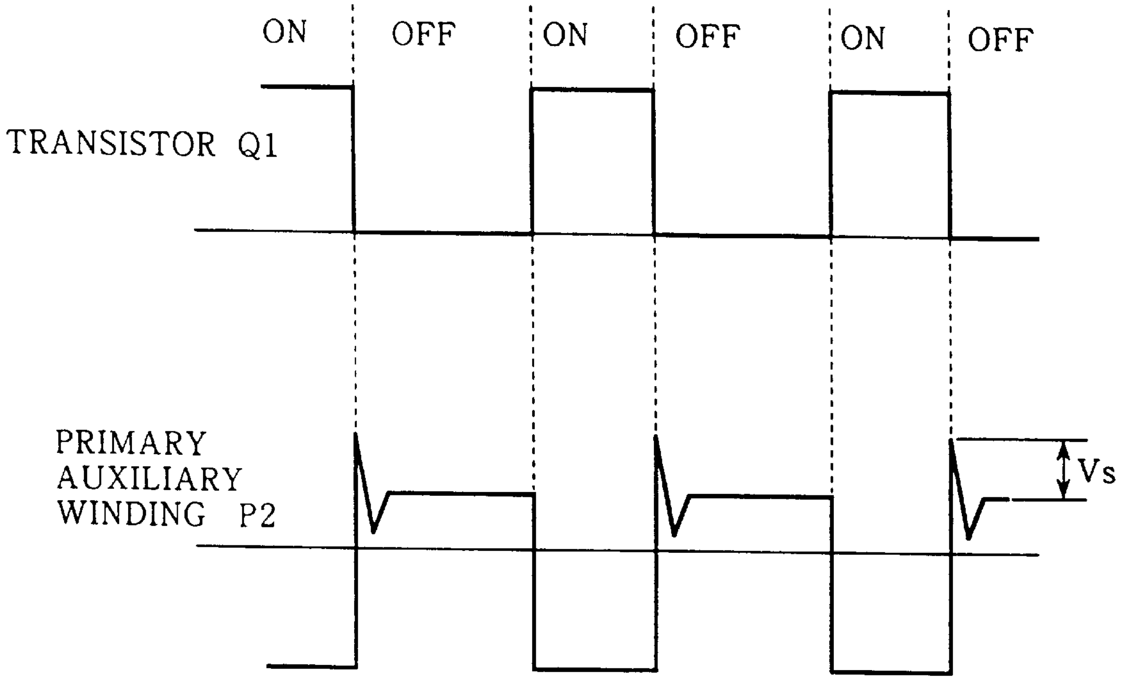
FIG. 9 (PRIOR ART)
FIG. 9 is a view showing an on/off timing wave form of the switching element of a fry-back converter and an operation wave form of the primary auxiliary winding.

The primary auxiliary winding P2 is wound on the chamber 3*a* disposed adjacent to the chamber 3*b* on which the second winding S2 always exhausting the electric power is wound. Thus, the magnetic connection between the primary auxiliary winding P2 and the secondary winding S2 is strong, and the magnetic connection between the primary auxiliary winding P2 and the primary excitation winding P1-1 is weakened further, whereby the spike voltage Vs as shown in FIG. 9 can be reduced. Reduction of the spike voltage Vs allows for easy control of the flyback converter circuit and prevents erroneous operation of the overvoltage protection circuit. Thus, the inductor L1, the resistor R4 and the like for suppressing the spike voltage Vs of the primary auxiliary winding P2 as shown in FIG. 6 or the snubber circuit (the capacitor C3 and the resistor R3) can be removed or reduced in number. As a result, the number of components of the transformer can be reduced and/or the components can be miniaturized, leading to the reduction of the cost of the transformer. As the primary auxiliary winding P2 and the primary excitation windings P1-1 and P1-2 are wound on the different chambers 3*a*, 3*c* and 3*e*, the electrical insulation between the primary auxiliary winding P2 and the primary excitation windings P1-1 and P1-2 is remarkably improved, thereby enhancing the reliability of the transformer.

Since the secondary winding S1 is wound on the chamber 3*d* between the chambers 3*c* and 3*e* on which the divided primary excitation windings P1-1 and P1-2 are wound, the leakage inductance between the windings P1-1, P1-2 and S1 can be reduced thereby lowering the spike voltage produced in these windings. The primary excitation windings consist of only two divided primary excitation windings P1-1 and P1-2. Thus, the number of the windings of the converter transformer is limited to a minimum, so that a small and inexpensive converter transformer in which the number of the terminal pins of the converter transformer is limited to a minimum is provided.

Figure 2A:
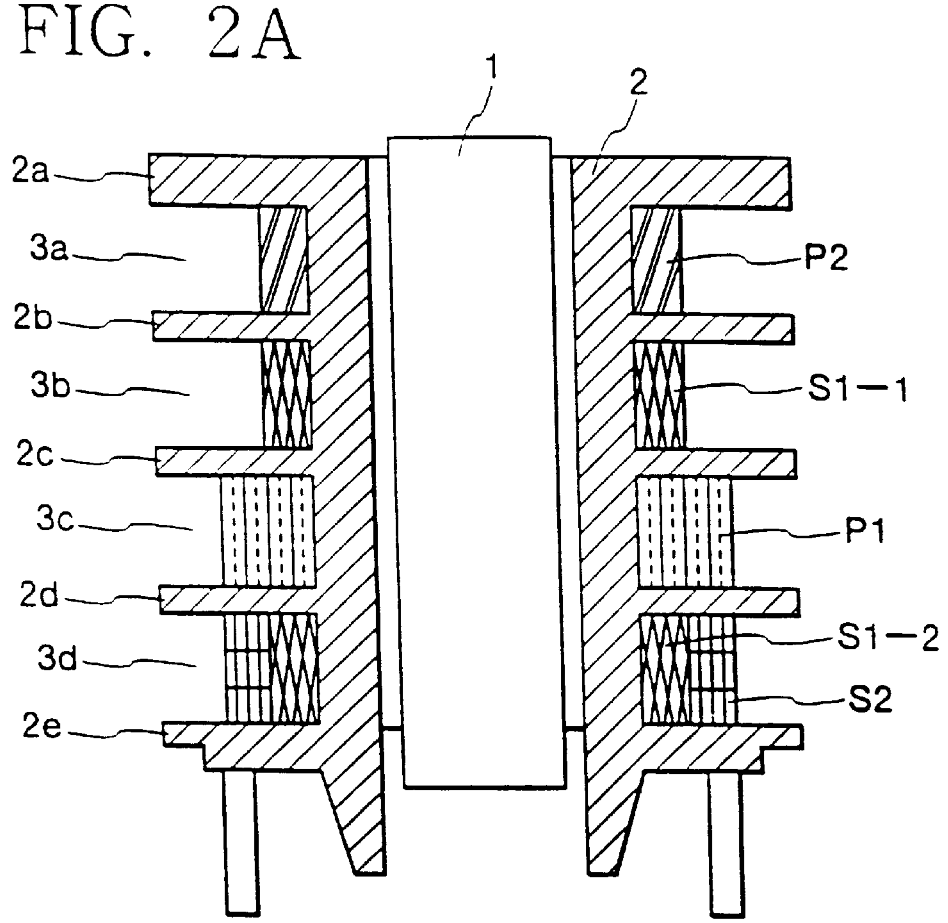
FIG. 2A is a cross-sectional view of another embodiment of the converter transformer according to the present invention.
Figure 2B:
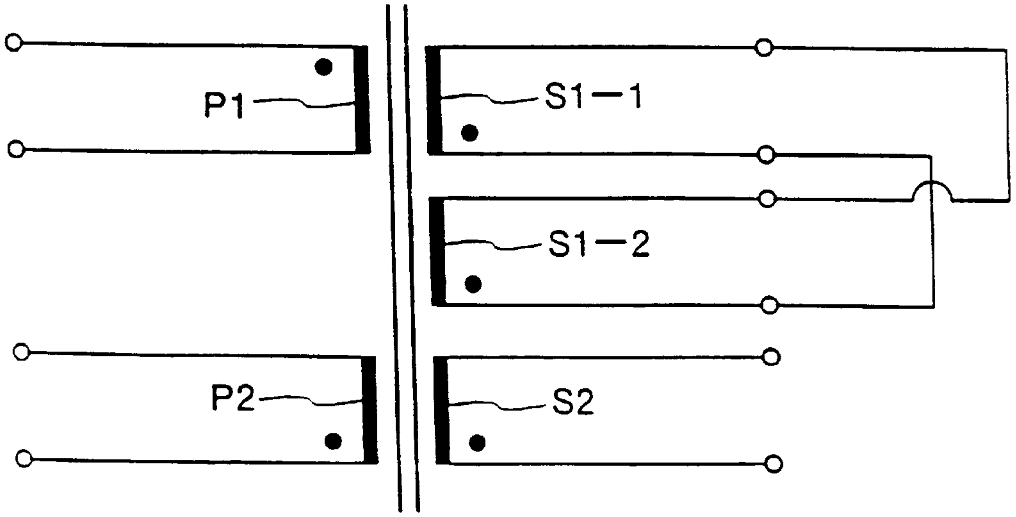
FIG. 2B is a circuit diagram of the embodiment of FIG. 2A.

FIGS. 2A and 2B are a cross-sectional view and a circuit diagram of a second embodiment of the present invention. This embodiment has four chambers 3*a* to 3*d* defined between the flanges 2*a* to 2*e*. A primary excitation winding P1 is not divided and is wound only one chamber 3*c*, whereas the secondary windings which produce the main operating voltage consist of two divided secondary windings S1-1 and S1-2 and are wound on the chambers 3*b* and 3*d* on both sides of the chamber 3*c* for the primary excitation winding P1. The chamber 3*b* for one of the divided secondary windings, S1-1, is arranged adjacent to the chamber 3*a* on which the primary auxiliary winding P2 is wound and the divided secondary windings S1-1 and S1-2 are connected in parallel. A secondary winding S2 which produces another operating voltage is wound on the outer periphery of the divided secondary winding S1-2.

The arrangement of the secondary winding S1-1 on the chamber 3*b* between the primary auxiliary winding P2 and the primary excitation winding P1 weakens the magnetic connection between the primary auxiliary winding P2 and the primary excitation winding P1. Even if a specific load does not exist, parallel connection between the divided secondary windings S1-1 and S1-2 causes a reactive current to flow through the windings S1-1 and S1-2 due to the difference of inductances produced from the difference of the winding positions or the like of the windings S1-1 and S1-2. Thus, the magnetic connection between the primary excitation winding P1 and the primary auxiliary winding P2 is reduced further so that the spike voltage Vs is remarkably reduced. Similarly to the case of the embodiment as shown in FIG. 1, this makes it possible to control the fly-back converter easily, prevent erroneous operation of the overvoltage protection circuit, reduce the number of the parts such as a snubber circuit, miniaturize the parts and reduce the cost. Since the primary auxiliary winding P2 and the primary excitation winding P1 are wound on the different chambers 3*a* and 3*c*, the electrical insulation between the primary auxiliary winding P2 and the primary excitation winding P1 is remarkably enhanced, thereby improving reliability.

The arrangement of the primary winding P1 between the secondary windings S1-1 and S1-2 can reduce the leakage inductance, whereby the spike voltages produced in the windings P1, S1-1 and S1-2 can be reduced. Further, because the secondary winding are divided into only two secondary windings S1-1 and S1-2 , the number of the windings of the convert transformer is limited to a minimum. Thus, a small and inexpensive converter transformer in which the number of the terminal pins of the converter transformer is also limited to a minimum can be provided.

Figure 3A:
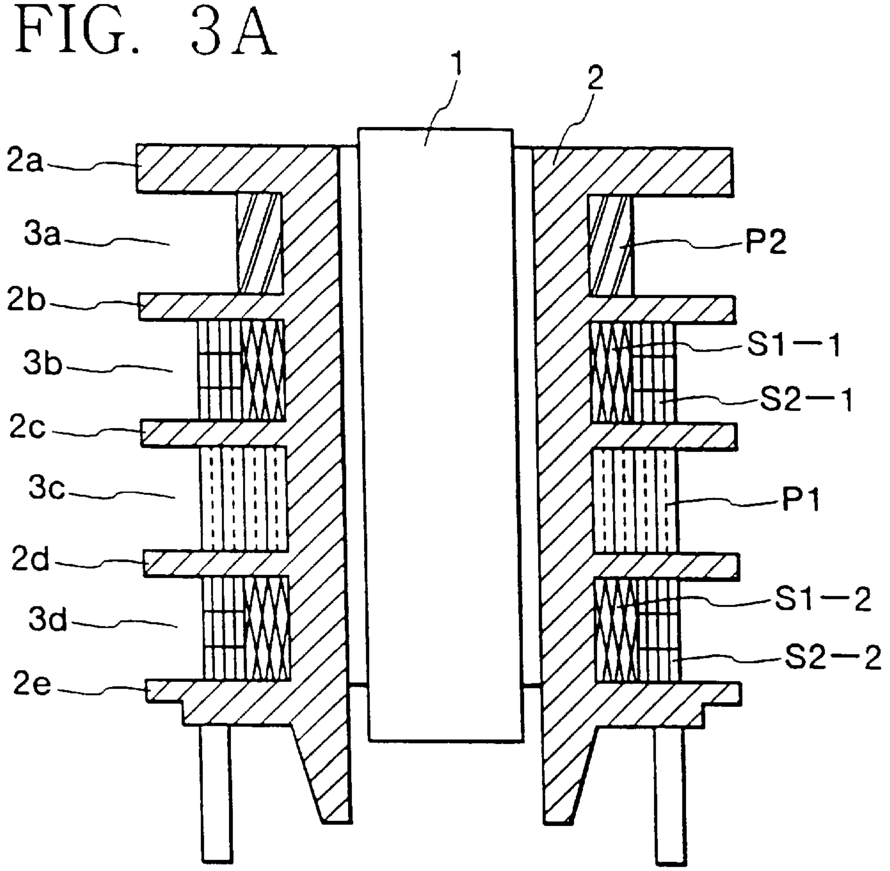
FIG. 3A is a cross-sectional view of still another embodiment of the converter transformer according to the present invention.
Figure 3B:
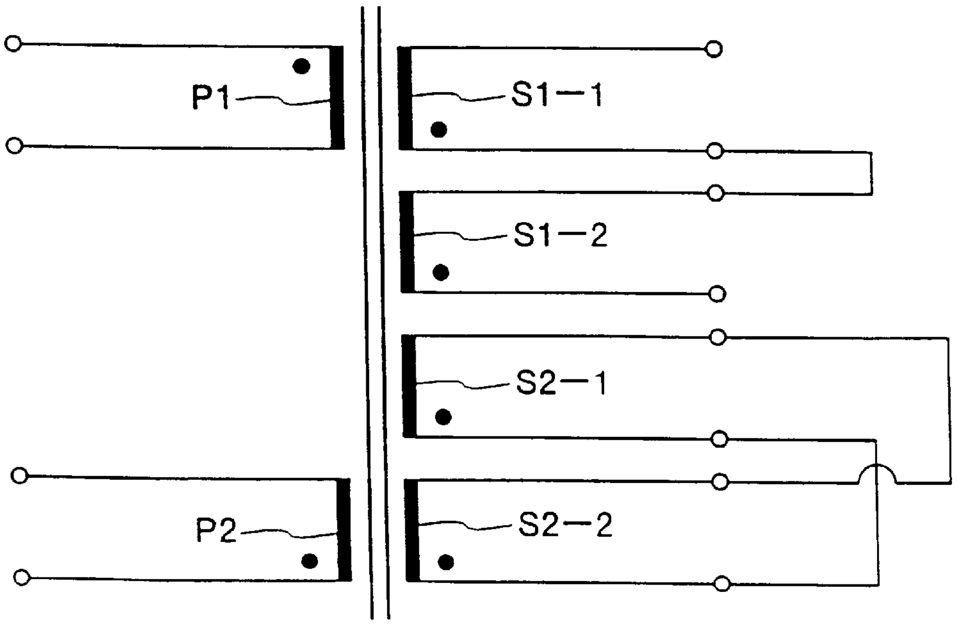
FIG. 3B is a circuit diagram of the embodiment of FIG. 3A.

FIGS. 3A and 3B are a cross-sectional view and a circuit diagram of a third embodiment according to the present invention. The differences of this embodiment from the embodiment as shown in FIGS. 2A and 2B are that the secondary windings S2 which produce another operating voltage also comprise two secondary windings S2-1 and S2-2 and a pair of the secondary windings S1-1 and S2-1 are wound on a chamber 3*b* so that the one overlaps on the other, that the primary auxiliary winding P2 and the primary excitation winding P1 are arranged on both sides of the secondary windings S1-1 and S2-1, respectively, and that the other pair of the secondary winding sections S1-2 and S2-2 are wound on a chamber 3*d* so that the one overlaps on the other. The former pair of the secondary windings S1-1 and S1-2 are connected in series whereas the latter pair of the divided secondary windings S2-1 and S2-2 are connected in parallel. With these connections, a reactive current flows through the secondary winding sections S2-1 and S2-2 connected in parallel even if no electric power is obtained from the secondary windings S1-1, S1-2, S2-1 and S2-2. This further weakens the magnetic connection between the primary excitation winding P1 and the primary auxiliary winding P2, thereby allowing the spike voltage Vs of the primary auxiliary winding P2 to be lowered. Thus, this arrangement achieves the same technical effects as those attained by the embodiments as shown in Figs. 1A and 1B and in FIGS. 2A and 2B. In other words, the fly-back converter can be controlled easily, the overvoltage protection circuit can be prevented from operating erroneously, the number of the members such as the snubber circuit can be reduced, the parts can be made small and the converter transformer can be manufactured at a low cost. Since the primary auxiliary winding P2 and the primary excitation winding P1 are wound on the different chambers 3*a* and 3*c*, the electrical insulation between the primary auxiliary winding P2 and the primary excitation winding P1 is remarkably enhanced, resulting in high reliability.

The arrangement of the primary excitation winding P1 between the secondary windings S1-1 and S1-2 strengthens the magnetic connection therebetween and can reduce the leakage inductance therebetween. Thus, the spike voltages produced in the windings P1, S1-1 and S1-2 can also be reduced.

The second windings consist of the secondary windings S1-1 and S1-2 which produce the main operating voltage and the secondary windings S2-1 and S2-2, whereas the primary excitation winding P is not divided. Thus, as compared with the case where the primary excitation winding P1 as shown in FIG. 8, the number of the windings of the converter transformer is reduced and the number of the terminal pins of the converter transformer is also made smaller, whereby a small and inexpensive converter transformer can be provided.

Figure 4:
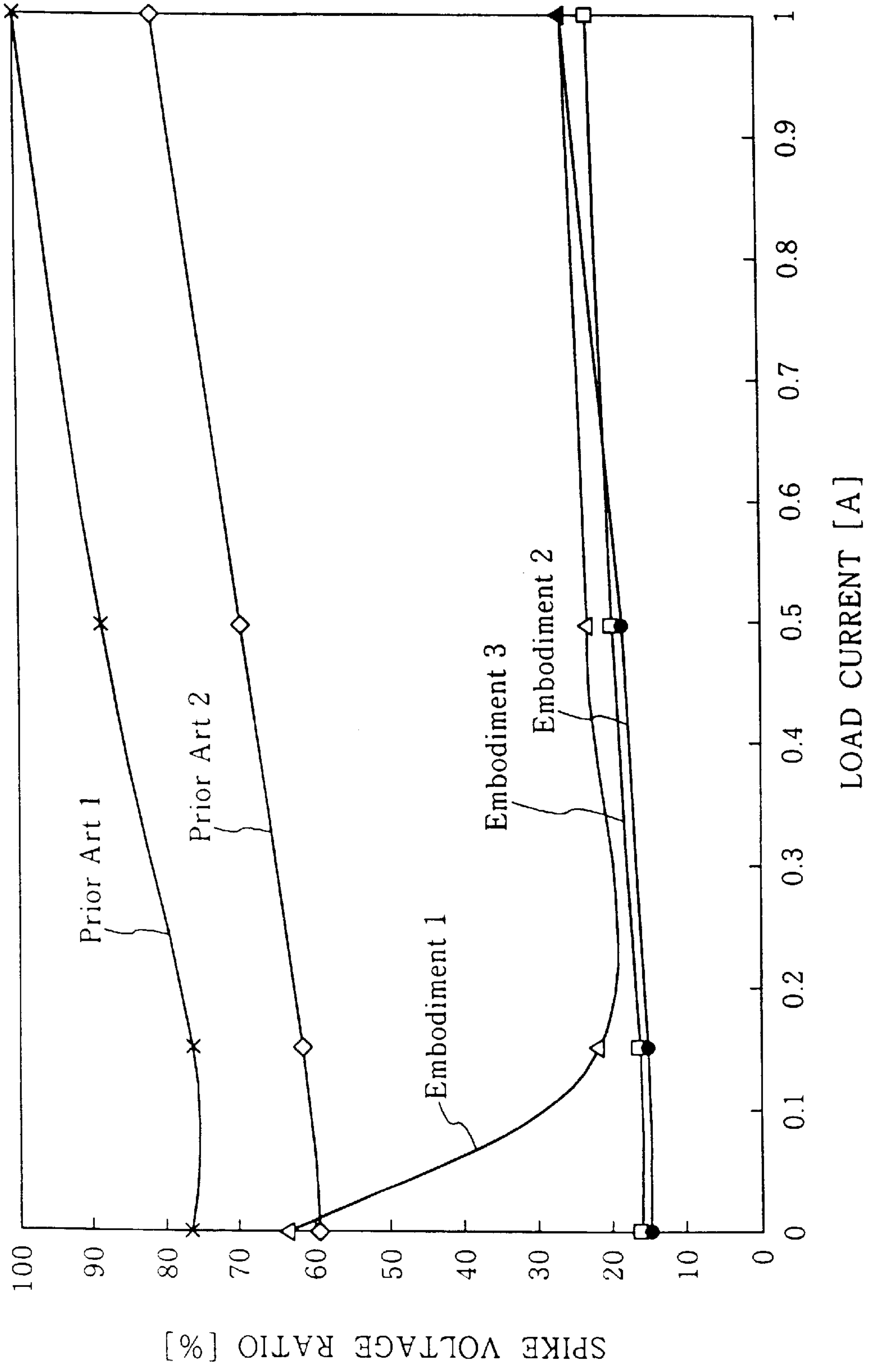
FIG. 4 is a comparative chart of spike voltages and currents between the embodiments of the present invention and the prior art.
Figure 7A:
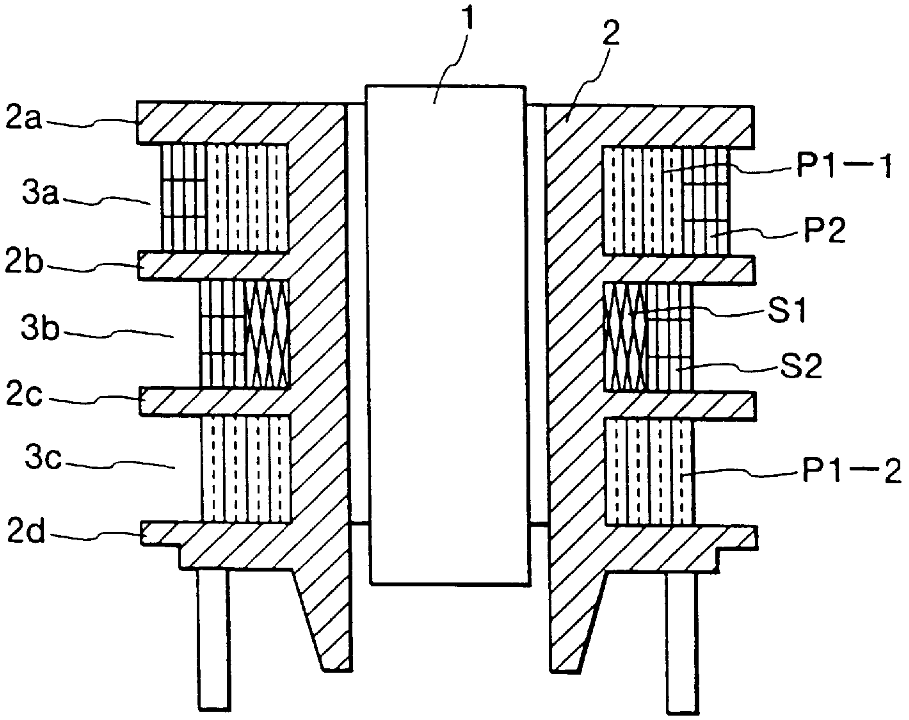
FIG. 7A (PRIOR ART)
FIG. 7A is a cross-sectional view of one of the conventional converter transformers.
Figure 7B:
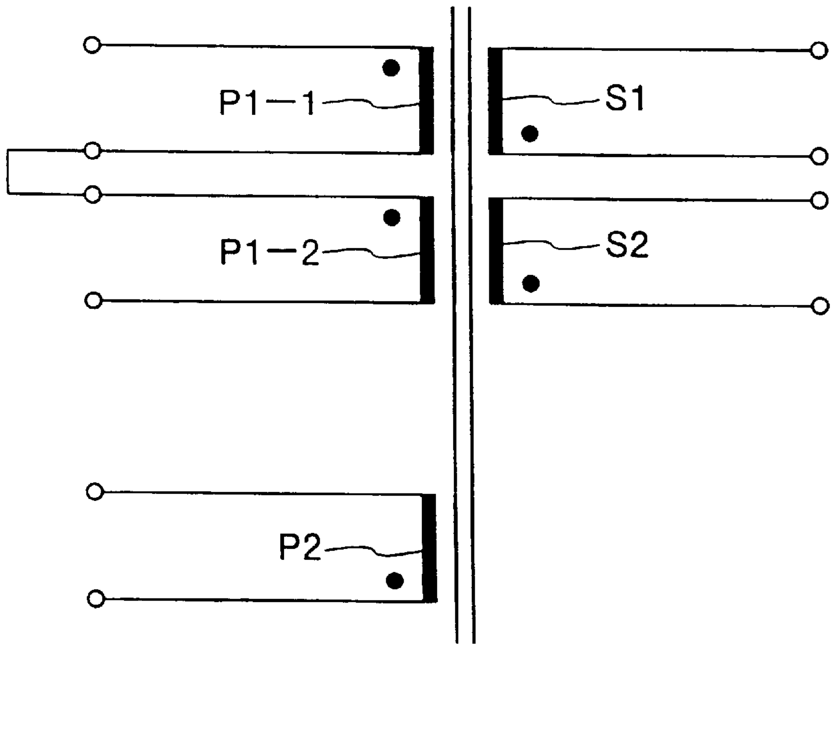
FIG. 7B (PRIOR ART)
FIG. 7B is a circuit diagram of FIG. 7A.
Figure 8A:
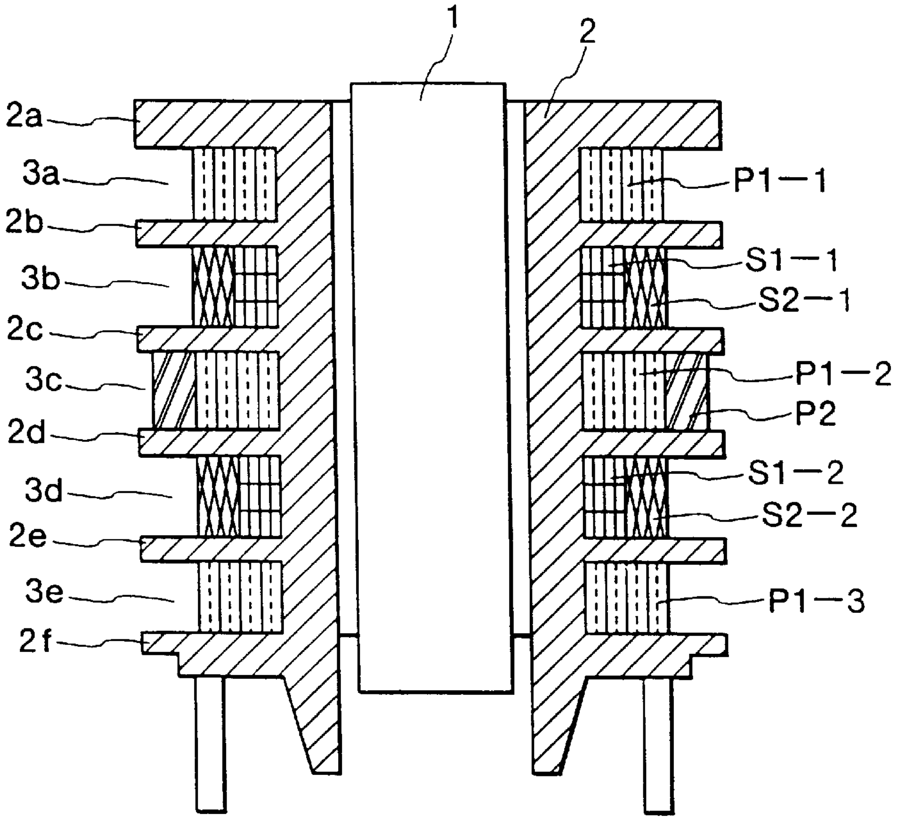
FIG. 8A (PRIOR ART)
FIG. 8A is a cross-sectional view of another conventional converter transformer.
Figure 8B:
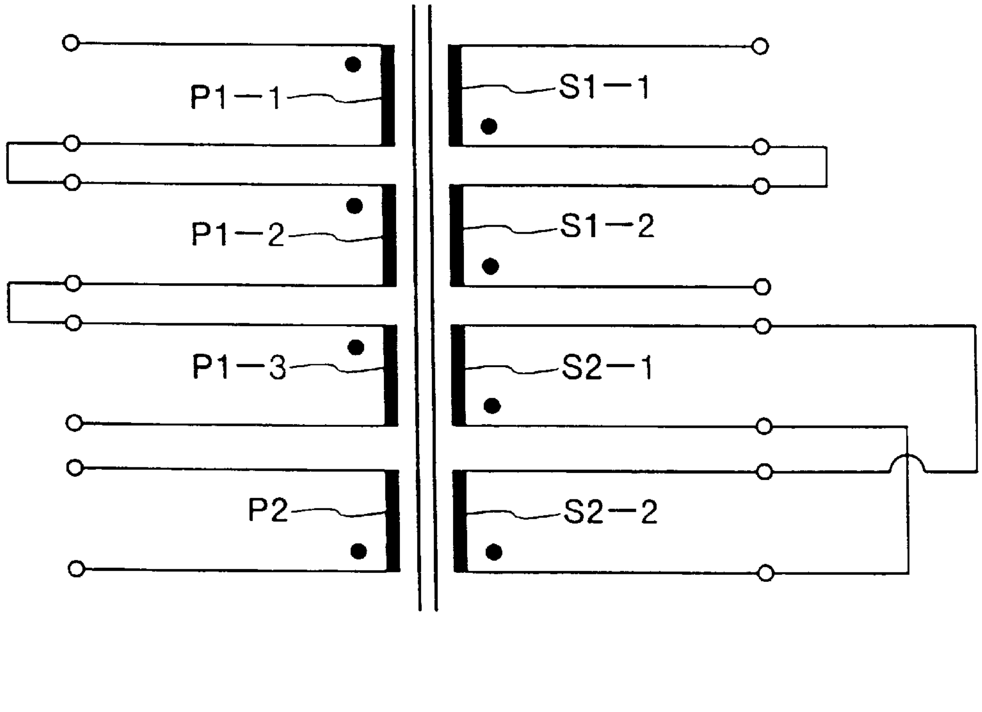
FIG. 8B (PRIOR ART)
FIG. 8B is a circuit diagram of FIG. 8A.

In FIG. 4 are illustrated the comparative relationships of the load currents versus the spike voltage ratios between the first to third embodiments (indicated as Embodiment 1, Embodiment 2 and Embodiment 3, respectively) and the two cases of prior art ( i.e., Prior Art 1 as shown in FIGS. 7A and 7B and Prior Art 2 as shown in FIGS. 8A and 8B). The tests were made under the conditions in which the input AC voltage of the present invention and the prior art is 100V, the output voltages V1 and V2 of the secondary windings S1 and S2 are 14V and 6.5V, respectively. As understood from FIG. 4, the spike voltage Vs of the present invention is reduced to about one-third of the prior art 1 and 2.

In Embodiment 1, the spike voltage Vs is rapidly reduced as the load current increases within the rage of the load current of 0A to substantially 0.2A In Embodiments 1 and 2, a reactive current flows even if no load is connected. When the load current is zero, therefore, the spike voltage Vs is much lower than that of the prior art.

Figure 5A:
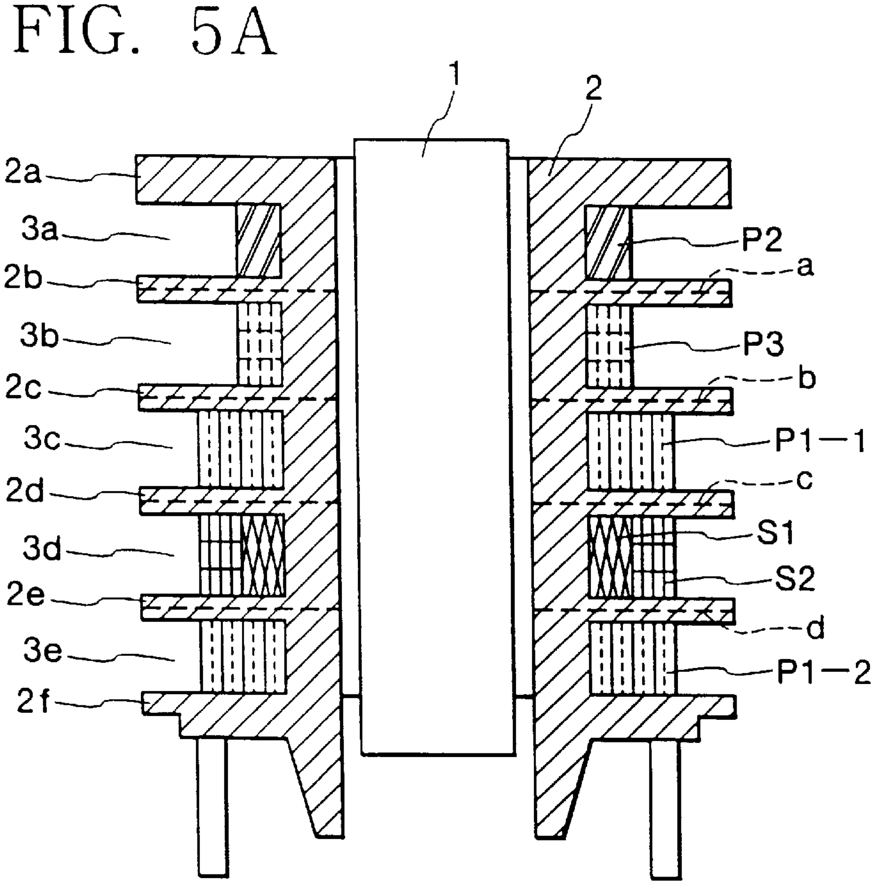
FIG. 5A is a further embodiment of the converter transformer according to the present invention.
Figure 5B:
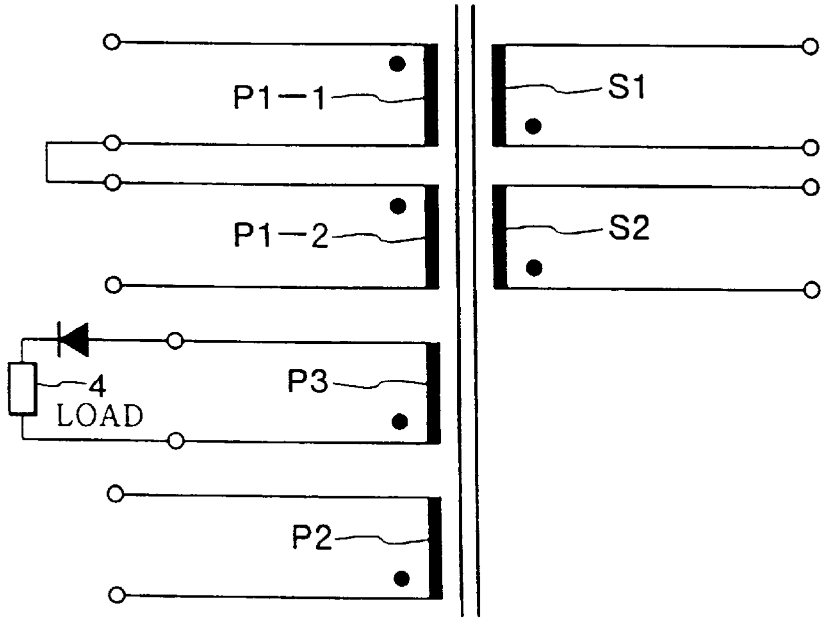
FIG. 5B is a circuit diagram of the embodiment of FIG. 5A.

In all embodiments of the present invention, the secondary winding S2, S1-1 or S2-1 which always consumes the electric power is provided on the chamber 3*b* between the primary auxiliary winding P2 and the primary excitation winding P1 or the primary excitation winding P1-1. However, as shown in FIGS. 5A and 5B which are a cross-sectional view and a circuit diagram of a fourth embodiment of the present invention, a primary winding P3, which is other than primary excitation winding P1 and the primary auxiliary winding P2 and which always consumes the electric power, may be provided on the chamber 3*b* which is between the chamber 3*a* of the primary auxiliary winding P2 and the chamber 3*c* of the primary excitation winding P1-1. Further, a plurality of chambers may be provided between the primary auxiliary winding P2 and the primary excitation winding P1-1 or the primary excitation winding P1, and primary windings or the secondary windings which always consume the electric power may be wound on thereon.

In the first to third embodiments as shown in FIGS. 1A and 1B, FIGS. 2A and 2B and FIGS. 3A and 3B, the chambers 3*a* to 3*e* are individually manufactured and may have connecting faces a to d as those of the fourth embodiment shown in FIG. 5A, and the adjacent connecting faces a to d of the chambers 3*a* to 3*e* may be adhered to each other or fitted together or fastened together by means of connecting members. Upon manufacturing a transformer by connecting a plurality of bobbins, different windings can be wound on the different bobbins. Thus, the productivity and the operating efficiency of the transformer can be improved. When the wires of the windings P1 (or P1-1 and P1-2), P2, P3, S1 (or S1-1 and S1-2) and S2 (or S2-1 and S2-2) have the same diameter, only one kind of wire is used, leading to easy management and control and a low manufacturing cost of a transformer.

What is claimed is:

1. A fly-back converter comprising:

a converter transformer including a bobbin made of resin and having an outer periphery and at least four flanges formed in tandem on said outer periphery;

at least three chambers defined by the flanges;

a primary auxiliary winding for supplying an and overvoltage to the drive-control and overvoltage protection circuit, said primary auxiliary winding being wound on one of said chambers;

a primary excitation winding wound on another of said chambers, which is separated by at least one chamber from said primary auxiliary winding; and at least one secondary winding wound on one of said at least one chambers between said primary auxiliary winding and said primary excitation winding, said secondary winding being connected to a load that exhausts the electric power such that the secondary winding always exhausts the electric power.

2. The fly-back converter of claim 1, wherein the output power of said fly-back converter is within the range of 15 watts to 30 watts, and the electric power exhausted by said load is within the range of 0.3 watts to 2.0 watts.

* * * * *